United States Patent [19]
Laney

[11] Patent Number: 6,006,943
[45] Date of Patent: Dec. 28, 1999

[54] COOKING INSTRUMENT WITH SECURABLE LID

[76] Inventor: Jack W. Laney, 230 E. 15th St., Suite 1-J, New York, N.Y. 10003

[21] Appl. No.: 09/032,058

[22] Filed: Feb. 27, 1998

[51] Int. Cl.[6] .................................................. B65D 43/03
[52] U.S. Cl. ......................... 220/379; 220/212; 220/298; 220/573.1; 220/912
[58] Field of Search ................................. 220/212, 293, 220/296, 298, 379, 573.1, 912

[56] References Cited

U.S. PATENT DOCUMENTS

| | | | |
|---|---|---|---|
| 3,081,395 | 3/1963 | Wickenberg | 220/379 X |
| 5,150,804 | 9/1992 | Blanchet et al. | 220/212 |
| 5,868,268 | 2/1999 | Walker | 220/379 |

FOREIGN PATENT DOCUMENTS 2556492  6/1977  Germany ................................ 220/379

Primary Examiner—Stephen K. Cronin
Attorney, Agent, or Firm—Standley & Gilcrest LLP

[57] ABSTRACT

The present invention is directed to a cooking instrument that has a lid which may be secured to a vessel. The present invention is also directed to a method for securing a lid to a vessel. The cooking instrument includes a vessel, a lid, a first flange, and a second flange. The vessel has a base and a wall. The wall extends upward from the base to define a first opening, and the wall has an outer surface which is substantially cylindrical. The lid is adapted to cover the first opening of the vessel. The lid has a top and a rim. The rim extends downward from the top to define a second opening, and the rim has an inner surface which is substantially cylindrical. The first flange and the second flange enable the lid to be secured to the vessel. The first flange is attached to the outer surface of the vessel, and the second flange is attached to the inner surface of the lid. The base of the vessel may be placed a predetermined depth inside the second opening of the lid. After the base is adequately placed inside the second opening of the lid, the vessel may be rotated in a predetermined direction with respect to the lid approximately until the first flange is adequately engaged by the second flange in order to secure the lid to the vessel.

24 Claims, 4 Drawing Sheets

COOKING INSTRUMENT WITH SECURABLE LID

SUMMARY OF THE INVENTION

The present invention is directed to a cooking instrument that has a lid which may be secured to a vessel. The cooking instrument includes a vessel, a lid, a first flange, and a second flange. The vessel may be a pot or a pan. The vessel has a base and a wall. The wall extends upward from the base to define a first opening, and the wall has an outer surface which is substantially cylindrical. The lid is adapted to cover the first opening of the vessel, typically at a relatively close, but non-interfering tolerance, so a to allow the flanges to cooperate to secure the lid to the vessel as described herein. The lid has a top and a rim, the rim extending downward from the top to define a second opening, and the rim having an inner surface which is substantially cylindrical. The first flange and the second flange allow the lid to be secured to the vessel. The first flange is attached to the outer surface of the vessel, and the second flange is attached to the inner surface of the lid. The first flange and the second flange may both be curved. The base of the vessel may be placed a predetermined depth inside the second opening of the lid. After the base is adequately placed inside the second opening of the lid, the vessel may be rotated in a predetermined direction with respect to the lid approximately until the first flange is adequately engaged by the second flange in order to secure the lid to the vessel.

In addition to the first flange, the vessel may have at least one more flange attached to its outer surface. Similarly, the lid may have at least one more flange attached to its inner surface in addition to the second flange. Consequently, rotating the vessel in a predetermined direction with respect to the lid may cause at least one other pair of flanges to be adequately engaged at substantially the same time the first flange is adequately engaged by the second flange. Moreover, the adequate engagement of at least one other pair of flanges may be necessary to secure the lid to the vessel.

In addition, the cooking instrument may comprise a handle extending from the outer surface of the vessel. The cooking instrument may also comprise a knob attached to the top of the lid. Moreover, the cooking instrument may have means to indicate when the first flange is adequately engaged by the second flange. For instance, the knob may be adapted to indicate when the first flange is adequately engaged by the second flange. In addition, a position of the knob relative to the handle may indicate when the first flange is adequately engaged by the second flange.

The present invention is also directed to a method for securing a lid to a vessel. First, a vessel, a lid, a first flange, and a second flange are provided. The vessel may be a pot or a pan. The vessel has a base and a wall. The wall extends upward from the base to define a first opening, and the wall has an outer surface which is substantially cylindrical. The lid is adapted to cover the first opening of the vessel. The lid has a top and a rim. The rim extends downward from the top to define a second opening, and the rim has an inner surface which is substantially cylindrical. The first flange and the second flange allow the lid to be secured to the vessel. The first flange is attached to the outer surface of the vessel, and the second flange is attached to the inner surface of the lid. The first flange and the second flange may both be curved. In order to secure the lid to the vessel, the base of the vessel is placed a predetermined depth inside the second opening of the lid. After the base is adequately placed inside the second opening of the lid, the vessel is rotated in a predetermined direction with respect to the lid approximately until the first flange is adequately engaged by the second flange.

In addition to the first flange, at least one more flange may be attached to the outer surface of the vessel. Similarly, the lid may have at least one more flange attached to its inner surface in addition to the second flange. As a result, rotating the vessel in a predetermined direction with respect to the lid may cause at least one other pair of flanges to be adequately engaged at substantially the same time the first flange is adequately engaged by the second flange. Moreover, the adequate engagement of at least one other pair of flanges may be necessary to secure the lid to the vessel.

A handle may be attached to the outer surface of the vessel. On the other hand, a knob may be attached to the top of the lid. Moreover, means may be provided to indicate when the first flange is adequately engaged by the second flange. For example, the knob may be adapted to indicate when the first flange is adequately engaged by the second flange. In addition, a position of the knob relative to the handle may indicate when the first flange is adequately engaged by the second flange.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

The present invention is directed to a cooking instrument that has a securable lid. The cooking instrument includes a vessel, a lid, a first flange, and a second flange. The first flange is attached to the outer surface of the vessel, and the second flange is attached to the inner surface of the lid. As a result, the lid may be secured to the vessel by engaging the first flange to the second flange.

Figure 1:
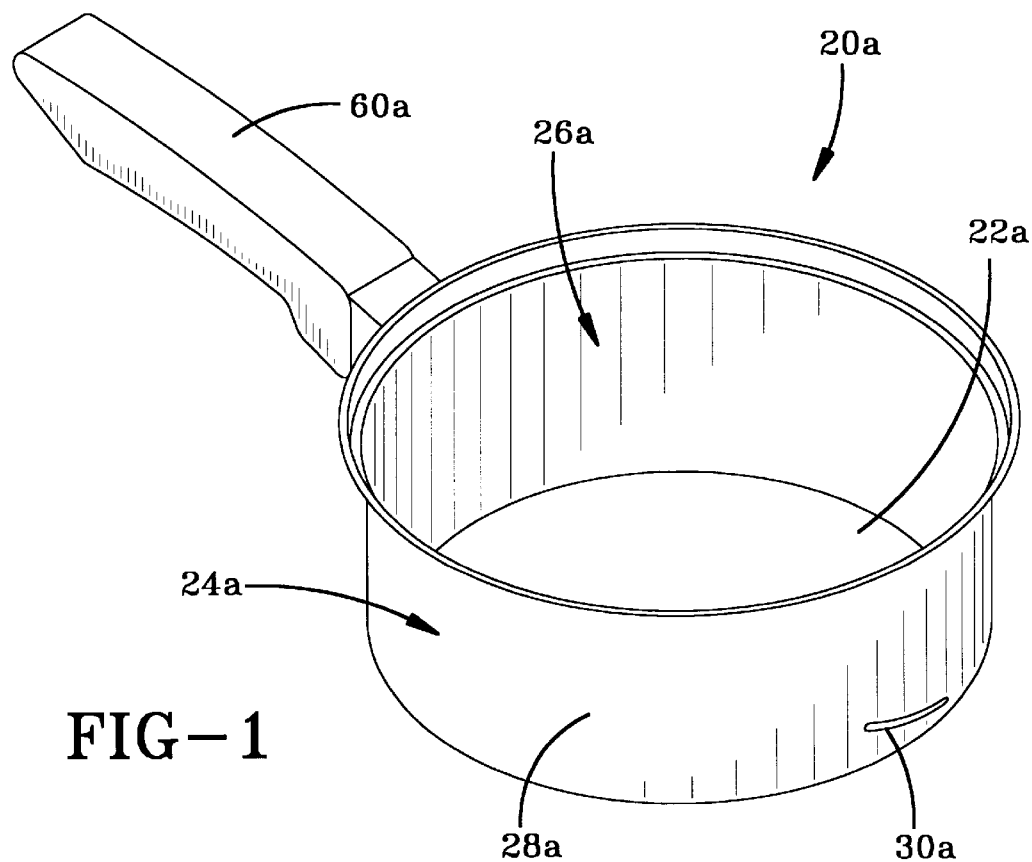
FIG. 1 is a perspective view of a preferred embodiment of the vessel of the present invention.

FIG. 1 illustrates a preferred embodiment of the vessel. The vessel 20*a* has a base 22*a* and a wall 24*a*. The wall 24*a* extends upward from the base 22*a* to define a first opening 26*a*. The outer surface 28*a* of the wall 24*a* is substantially cylindrical. A handle 60*a* extends from the outer surface 28*a*. In addition, a first flange 30*a* is attached to the outer surface 28*a*. The first flange 30*a* may be curved.

The vessel is substantially rigid, and it may be made from any material that is suitable for cooking purposes. The handle is also substantially rigid. The handle preferably includes a grip which enables a person to lift the vessel without burning a hand. Accordingly, the grip is preferably made from a relatively poor conductor of heat.

Figure 2:
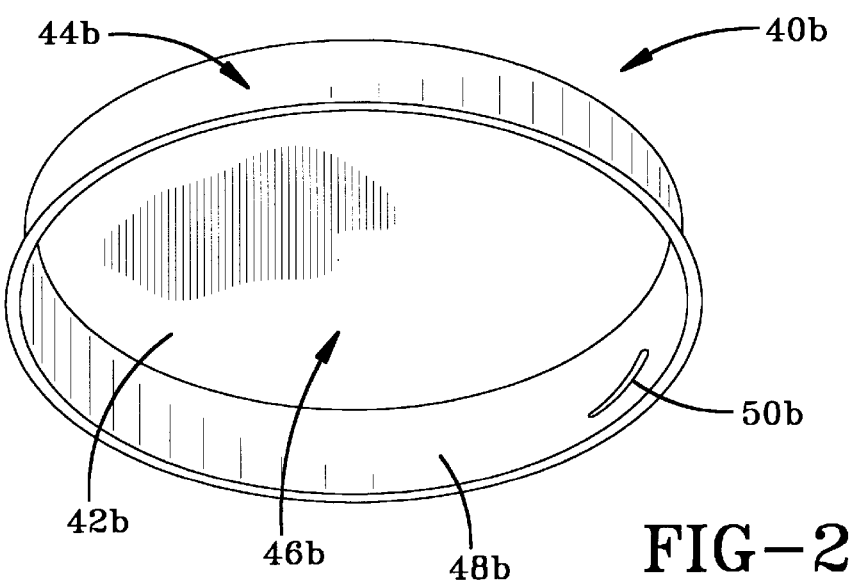
FIG. 2 is a perspective view of a preferred embodiment of the lid of the present invention.

FIG. 2 illustrates a preferred embodiment of the lid. The lid 40b has a top 42b and a rim 44b. The rim 44b extends downward from the top 42b to define a second opening 46b. The rim 44b has an inner surface 48b which is substantially cylindrical, and a second flange 50b is attached to the inner surface 48b. The second flange 50b may be curved.

Figure 3:
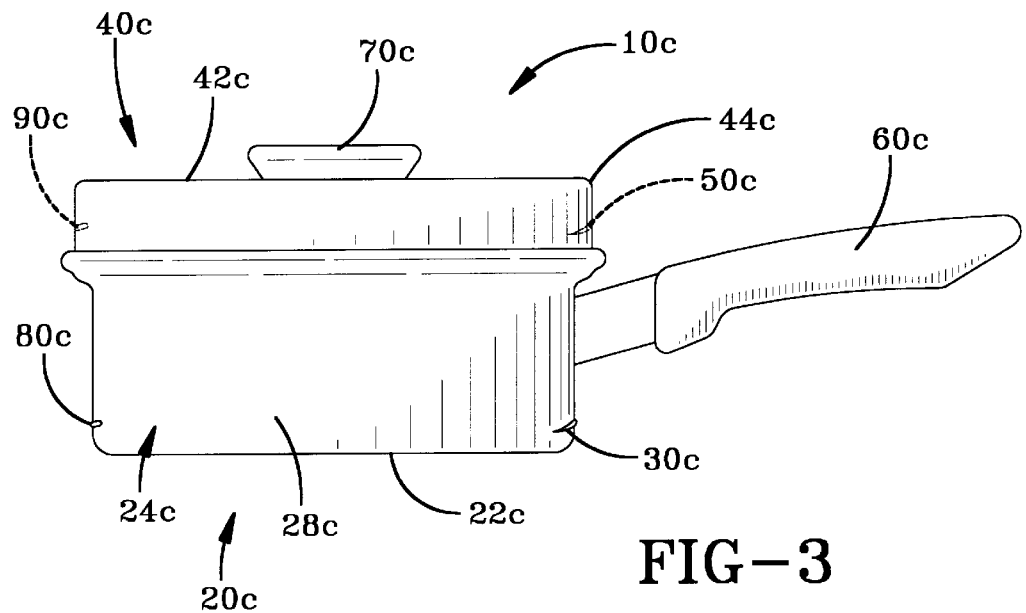
FIG. 3 is a side elevation view of a preferred embodiment of the lid covering the first opening of a preferred embodiment of the vessel.

The lid is substantially rigid, and it may be made from any material that is suitable for cooking purposes. Moreover, the lid is adapted to cover the first opening defined by the wall of the vessel. This feature is shown in FIG. 3. FIG. 3 illustrates a preferred embodiment of the lid disposed over the first opening of a preferred embodiment of the vessel. The cooking instrument 10c includes a vessel 20c and a lid 40c. The vessel 20c has a base 22c and a wall 24c. A handle 60c is attached to the outer surface 28c of the wall 24c. In addition, a first flange 30c and another flange 80c are attached to the outer surface 28c of the wall 24c. On the other hand, the lid 40c has a top 42c and a rim 44c. A second flange 50c and another flange 90c are attached to the inner surface of the rim 44c. In addition, a knob 70c is attached to the top 42c. The knob 70c preferably enables a person to lift the lid from the vessel without burning a hand. Accordingly, the knob 70c is preferably made from a relatively poor conductor of heat.

As shown in FIG. 3, the vessel may have a plurality of flanges attached to the outer surface, and the lid may have a plurality of flanges attached to the inner surface. An equal number of flanges do not have to be attached to the outer surface of the vessel and the inner surface of the lid. The number of flanges attached to the outer surface of the vessel may be more or less than the number of flanges attached to the inner surface of the lid. In addition, any of the flanges attached to the outer surface of the vessel may be curved, and any of the flanges attached to the inner surface of the lid may be curved.

Figure 4:
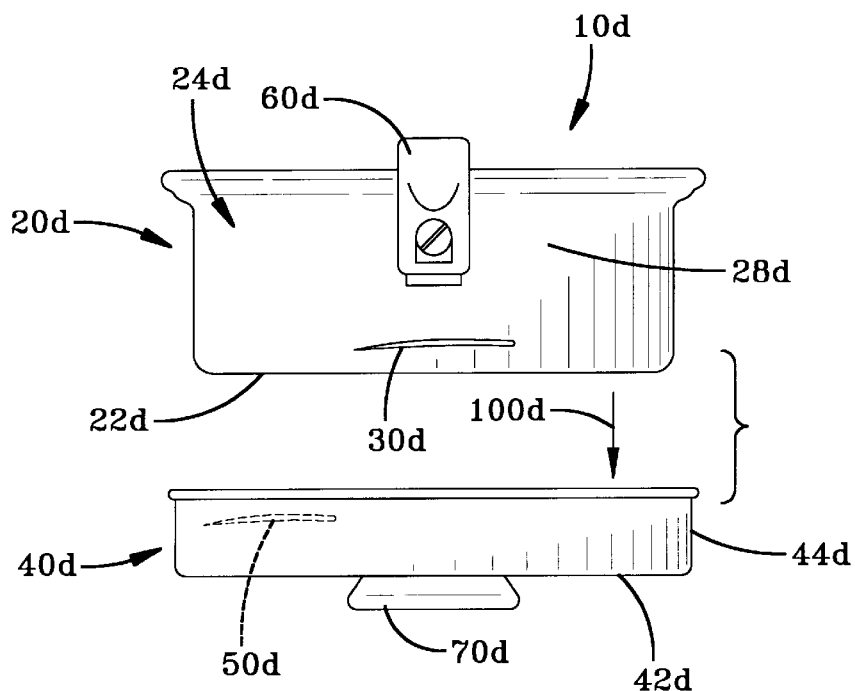
FIG. 4 is a side elevation view of a preferred embodiment of the vessel in position for the base to be placed a predetermined depth inside the second opening of a preferred embodiment of the lid.

In order to secure the lid to the vessel, the base of the vessel is first placed a predetermined depth inside the second opening of the lid. FIG. 4 shows a preferred embodiment of the vessel in position for the base to be placed a predetermined depth inside the second opening of a preferred embodiment of the lid. In FIG. 4, the cooking instrument 10d includes a vessel 20d and a lid 40d. The vessel 20d has a base 22d and a wall 24d. A first flange 30d and a handle 60d are attached to the outer surface 28d of the wall 24d. The lid 40d has a top 42d and a rim 44d. A knob 70d is attached to the top 42d, and a second flange 50d is attached to the inner surface of the lid 40d. The vessel 20d and the lid 40d are positioned such that the base 22d of the vessel 20d faces the second opening of the lid 40d. The base 22d is adapted to fit into the second opening of the lid 40d. The base 22d may be placed inside the second opening of the lid 40d by moving it in the direction indicated by the arrow 100d. In order to place the base 22d a predetermined depth inside the second opening of the lid 40d, the vessel 20d is preferably aligned with respect to the lid 40d so that the first flange 30d does not prematurely abut the second flange 50d. Moreover, if a plurality of flanges are attached to the vessel or the lid, the vessel is preferably aligned with respect to the lid so that the flange or flanges attached to the vessel do not prematurely abut the flange or flanges attached to the lid.

Figure 5:
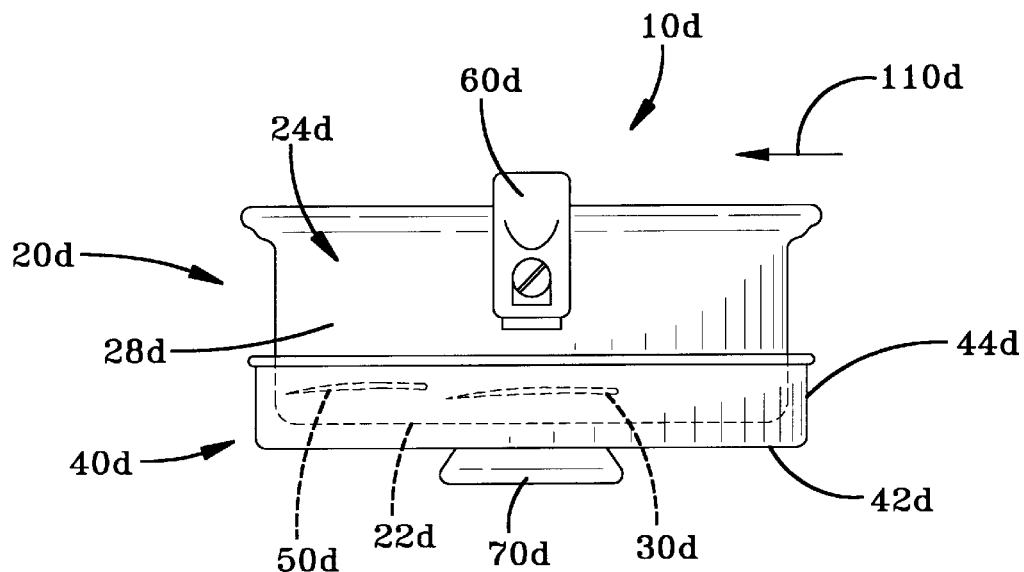
FIG. 5 is a side elevation view of the vessel and lid of FIG. 4 with the base placed a predetermined depth inside the second opening.
Figure 6:
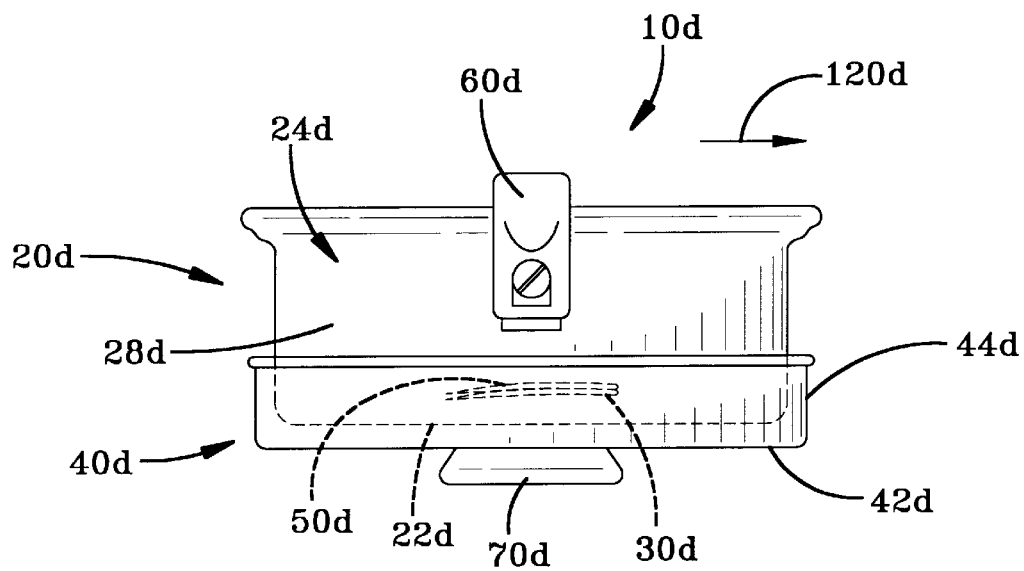
FIG. 6 is a side elevation view of the vessel and lid of FIG. 4 with the first flange adequately engaged by the second flange.

A predetermined depth is reached when the vessel 20d may be rotated with respect to the lid 40d in order to cause the first flange 30d to be adequately engaged by the second flange 50d. FIG. 5 shows the base 22d placed a predetermined depth inside the second opening of the lid 40d. In order to cause the first flange 30d to be adequately engaged by the second flange 50d, the vessel 20d may be rotated in the direction indicated by the arrow 110d. FIG. 6 shows the first flange 30d adequately engaged by the second flange 50d. In order to disengage the first flange 30d from the second flange 50d, the vessel may be rotated in the direction indicated by the arrow 120d.

The lid is secured to the vessel when the first flange is adequately engaged by the second flange. At least one other pair of flanges may also be adequately engaged at substantially the same time the first flange is adequately engaged by the second flange. Moreover, depending on the lengths, shapes, and curvatures of the first flange and the second flange, at least one other pair of flanges may need to be adequately engaged in order to secure the lid to the vessel. For example, for the embodiment shown in FIG. 3, the lid 40c may be secured to vessel 20c by causing substantially simultaneously the first flange 30c to be adequately engaged by the second flange 50c and the flange 80c to be adequately engaged by the flange 90c.

Figure 7:
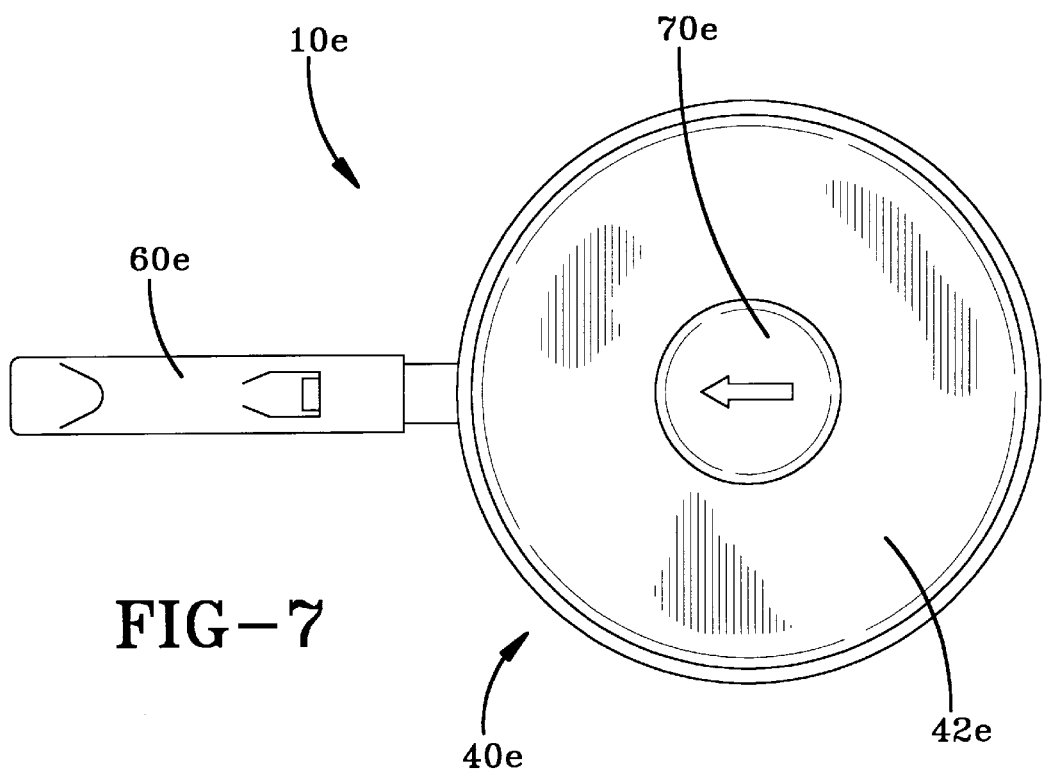
FIG. 7 is a bottom plan view of a preferred embodiment of the lid secured to a preferred embodiment of the vessel.

FIG. 7 illustrates a preferred embodiment of means which may be used to indicate when the first flange is adequately engaged by the second flange. As shown, the cooking instrument 10e includes a lid 40e, a top 42e, a handle 60e, and a knob 70e. In this embodiment, the knob 70e is adapted to indicate when the first flange is adequately engaged by the second flange. The knob 70e points to the handle 60e to indicate that the first flange is adequately engaged by second flange. Hence, a position of the knob 70e relative to the handle 60e indicates when the lid 40e is secured to the vessel.

Other means may also be used to indicate when the first flange is adequately engaged by the second flange. For instance, a position of the knob relative to a point on the vessel or to the handle may indicate when the first flange is adequately engaged by the second flange. Similarly, a point on the lid relative to a point on the vessel or to the handle may indicate when the first flange is adequately engaged by the second flange.

The present invention is also directed to a method for securing the above-described embodiments of the lid to the above-described embodiments of the vessel. First, a vessel, a lid, a first flange, and a second flange are provided. In order to secure the lid to the vessel, the base of the vessel is placed a predetermined depth inside the second opening of the lid. After the base is adequately placed inside the second opening of the lid, the vessel is rotated in a predetermined direction with respect to the lid approximately until the first flange is adequately engaged by the second flange.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A cooking instrument comprising:
 a vessel, said vessel having a base and a wall, said wall extending upward from said base to define a first opening, said wall having an outer surface which is substantially cylindrical;
 a first flange attached to said outer surface of said vessel;
 a lid adapted to cover said first opening, said lid having a top and a rim, said rim extending downward from said top to define a second opening, said rim having an inner surface which is substantially cylindrical; and
 a second flange attached to said inner surface of said lid;
 whereby said lid may be secured to said vessel by placing said base of said vessel a predetermined depth inside said second opening of said lid and then rotating said vessel in a predetermined direction with respect to said lid approximately until said first flange is adequately engaged by said second flange.

2. The cooking instrument of claim 1 further comprising a handle attached to said outer surface of said vessel.

3. The cooking instrument of claim 1 further comprising a knob attached to said top of said lid.

4. The cooking instrument of claim 3 wherein said knob is adapted to indicate when said first flange is adequately engaged by said second flange.

5. The cooking instrument of claim 3 further comprising a handle attached to said outer surface of said vessel;
 whereby a position of said knob relative to said handle indicates when said first flange is adequately engaged by said second flange.

6. The cooking instrument of claim 1 further comprising means to indicate when said first flange is adequately engaged by said second flange.

7. The cooking instrument of claim 1 wherein said first flange is curved.

8. The cooking instrument of claim 1 wherein said second flange is curved.

9. The cooking instrument of claim 1 wherein said vessel is a pot.

10. The cooking instrument of claim 1 wherein said vessel is a pan.

11. The cooking instrument of claim 1 further comprising:
 at least one more flange attached to said outer surface of said vessel; and
 at least one more flange attached to said inner surface of said lid;
 whereby rotating said vessel in a predetermined direction with respect to said lid causes at least one other pair of flanges to be adequately engaged at substantially the same time said first flange is adequately engaged by said second flange.

12. The cooking instrument of claim 11 wherein the adequate engagement of said at least one other pair of flanges is necessary to secure said lid to said vessel.

13. A method for securing a lid to a vessel, said method comprising the steps of:
 providing a vessel, said vessel having a base and a wall, said wall extending upward from said base to define a first opening, said wall having an outer surface which is substantially cylindrical;
 providing a first flange attached to said outer surface of said vessel;
 providing a lid adapted to cover said first opening, said lid having a top and a rim, said rim extending downward from said top to define a second opening, said rim having an inner surface which is substantially cylindrical;
 providing a second flange attached to said inner surface of said lid;
 placing said base of said vessel a predetermined depth inside said second opening of said lid; and
 rotating said vessel in a predetermined direction with respect to said lid approximately until said first flange is adequately engaged by said second flange.

14. The method of claim 13 further comprising a handle attached to said outer surface of said vessel.

15. The method of claim 13 further comprising a knob attached to said top of said lid.

16. The method of claim 15 wherein said knob is adapted to indicate when said first flange is adequately engaged by said second flange.

17. The method of claim 15 further comprising:
 a handle attached to said outer surface of said vessel;
 whereby a position of said knob relative to said handle indicates when said first flange is adequately engaged by said second flange.

18. The method of claim 13 further comprising the step of providing means to indicate when said first flange is adequately engaged by said second flange.

19. The method of claim 13 wherein said first flange is curved.

20. The method of claim 13 wherein said second flange is curved.

21. The method of claim 13 wherein said vessel is a pot.

22. The method of claim 13 wherein said vessel is a pan.

23. The method of claim 13 further comprising:
 at least one more flange attached to said outer surface of said vessel; and
 at least one more flange attached to said inner surface of said lid;
 whereby rotating said vessel in a predetermined direction with respect to said lid causes at least one other pair of flanges to be adequately engaged at substantially the same time said first flange is adequately engaged by said second flange.

24. The method of claim 23 wherein the adequate engagement of said at least one other pair of flanges is necessary to secure said lid to said vessel.

* * * * *

UNITED STATES PATENT AND TRADEMARK OFFICE
CERTIFICATE OF CORRECTION

PATENT NO. : 6,006,943

DATED : December 28, 1999

INVENTOR(S) :

Jack W. Laney

It is certified that error appears in the above-indentified patent and that said Letters Patent is hereby corrected as shown below:

In column 1, line 13, please delete the word "a" and replace it with -- as --.

Signed and Sealed this

Twenty-seventh Day of March, 2001

NICHOLAS P. GODICI

Attest:

Attesting Officer      Acting Director of the United States Patent and Trademark Office